Nov. 25, 1930.  C. W. HANSELL  1,783,014
SEMIRIGID CRYSTAL MOUNTING
Filed Jan. 21, 1927
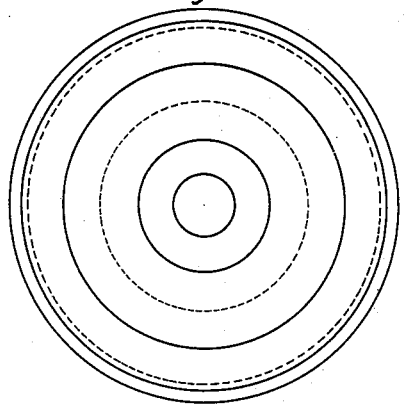
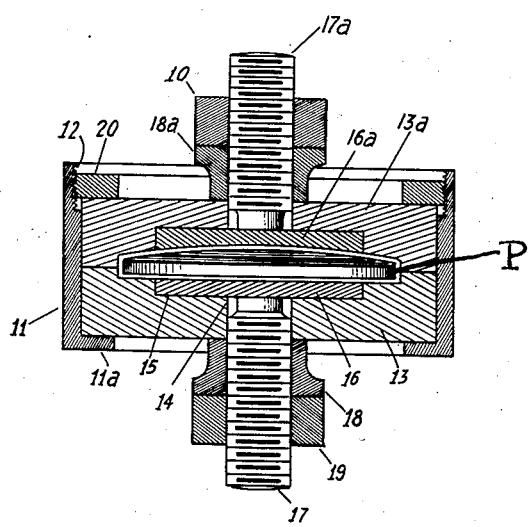
INVENTOR
C.W. HANSELL
BY
ATTORNEY Patented Nov. 25, 1930

1,783,014

UNITED STATES PATENT OFFICE

CLARENCE W. HANSELL, OF ROCKY POINT, NEW YORK, ASSIGNOR TO RADIO CORPORATION OF AMERICA, A CORPORATION OF DELAWARE

SEMIRIGID CRYSTAL MOUNTING

Application filed January 21, 1927. Serial No. 162,433.

This invention relates to the piezo-electric art and deals more specifically with a mounting for a piezo-electric crystal.

When a piezo-electrical crystal or quartz crystal oscillator is so mounted that it can slide around within its casing there is apt to be a change in its frequency of oscillation, which change usually amounts to an appreciable number of cycles per second. This follows for two reasons: first, when the crystal moves from one spot to another the distance between the crystal surface and its electrodes changes, thereby changing the capacity coupling between the crystal surfaces and the electrodes, which in turn causes a change in the frequency of oscillation of the crystal. Second, when the crystal moves to a different spot within its case the mechanical coupling between the surfaces of the crystal and the electrodes changes, and this also effects a change in the frequency. There is also the danger that if the crystal is allowed to slide around within its casing, it is apt to become wedged in between the electrodes and stop oscillating all together.

It is, therefore, an object of this invention to provide a semi-rigid crystal mounting in which the crystal cannot slide from side to side but in which the crystal is nevertheless free to oscillate with a minimum amount of damping.

It is a further object of this invention to provide a mounting for a piezo-electric crystal which is cheap to construct, easy to assemble and which is highly efficient in its operation.

These and other objects of the invention will be apparent to one skilled in the art from the following description taken in connection with the accompanying drawing in which:

Figure 1 is a sectional elevation of a device embodying the invention.

Figure 2 is a plan view of the device shown in Figure 1.

Referring in detail to the drawing the resonator 10 is seen to comprise a brass casing 11 formed with the circumferential flange 11ª. The opposite circumferential edge of the casing 11 is internally threaded at 12. Mounted in the casing 11 and supported by the flange 11ª is the disk 13 having the central aperture 14 and the countersunk portion 15. The disk 13 is preferably formed of micalex which is a commercial product formed by the fusion of silica and mica. This material is chosen for its electrical insulating characteristics and also its ability to withstand high temperatures. Obviously other suitable insulating materials having these properties may be chosen without departing from the spirit of this invention. Seated in the countersunk portion 15 is the plate 16 which is circular in shape and fits snugly therein. The electrode 17 is formed integrally with the plate 16 and extends outwardly of the casing through the aperture 14. The nut 18 holds the electrode in place and the nut 19 serves as a terminal for one of the lead wires. The upper section of the casing comprises the micalex disk 13ª which is shaped similarly to the lower disk 13 and which is provided with the second plate 16ª and electrode 17ª which are held in place in the casing by the nut 18ª. The micalex disk 16ª is held in place by an annular ring 20 which is provided with an outer threaded portion designed to co-operate with the threaded portion 12. The plate 16ª is formed with a surface which is concave outwardly as is also the portion of the micalex disk which is adapted to be placed adjacent to the piezo-electric crystal.

A piezo-electric crystal P, preferably of quartz shaped with an upper convex surface is ground, to the desired frequency, and is mounted in the opening formed between the disks 16 and 16ª which opening has substantially the same dimensions as the crystal within a few thousandths of an inch.

It will thus be seen that when a potential is applied across the electrodes 17 and 17ª and the crystal vibrates there can be no material shifting of the crystal with respect to the plates and the disadvantages described above are thereby overcome.

I claim as my invention:

1. A mounting for a piezo-electric crystal oscillator comprising an outer annular casing, a pair of insulating disks mounted within said casing, electrodes detachably mounted through said disks, and clamping means carried by each of said electrodes, said means being adjustable lengthwise of the electrodes, whereby to clamp each of said electrodes in fixed relationship with respect to the disc through which it is mounted.

2. A mounting for a piezo-electric crystal oscillator, comprising an outer annular casing, circular disks of insulating material carried by said casing, said disks being recessed to form a cavity, metallic plates mounted in spaced relation within said cavity, electrodes joined to said plates and secured to said disks, and terminals whereby said plates may be connected in an alternating current circuit.

3. A mounting for a piezo-electric crystal oscillator comprising an outer circular casing, a pair of insulating disks mounted in said casing in face to face relation, a threaded washer carried by said casing and holding said disks in place therein, said disks being formed with a recessed portion having one concave surface, metallic plates mounted within said recessed portion, one of said plates having a concave surface which coincides with said concave surface of said recess, electrodes joined to said plates passing through said disks and detachably held thereto, and terminals whereby said plates may be connected in an alternating current circuit.

4. A mounting for a piezo-electric crystal oscillator, comprising an outer annular casing, circular discs of insulating material carried by said casing, said discs being recessed to form a cavity, metallic plates mounted in space relation within said cavity, one of said plates having a curved surface, electrodes joined to said plates and secured to said discs, and terminals whereby said plates may be connected in an electric circuit.

5. In a piezo-electric device, the combination with a piezo-electric crystal having a curved surface, of a mounting therefor, said mounting being provided with means to limit the movement of the crystal, said means comprising a metallic plate having a surface of substantially the same curvature as the curved surface of the crystal.

6. In a piezo-electric device, the combination with a piezo-electric crystal having a curved surface, of a mounting therefor comprising a casing, a pair of plates mounted in said casing, one of said plates being shaped to conform substantially to the curvature of said curved surface of the crystal, and terminals on said plates whereby the crystal may be connected in an electric circuit.

CLARENCE W. HANSELL.